Figure 1:
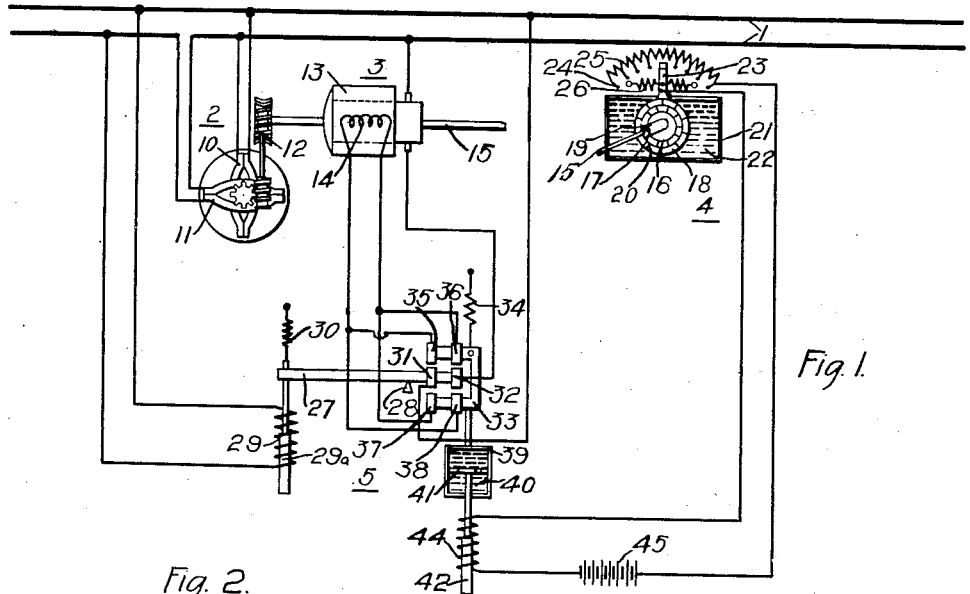

June 10, 1924.

C. A. BODDIE 1,497,401

REGULATING SYSTEM

Filed Sept. 16, 1918

2 Sheets-Sheet 1

WITNESSES:
N. B. Funk
W. B. Wells

INVENTOR
Clarence A. Boddie.
BY
Wesley G. Carr
ATTORNEY

June 10, 1924.                                    1,497,401
C. A. BODDIE
REGULATING SYSTEM
Filed Sept. 16, 1918           2 Sheets-Sheet 2

WITNESSES:
N. B. Funk.
W. B. Wells

INVENTOR
Clarence A. Boddie.
BY
ATTORNEY

Patented June 10, 1924.

1,497,401

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATING SYSTEM.

Application filed September 16, 1918. Serial No. 254,206.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Regulating Systems, of which the following is a specification.

My invention relates to regulating systems and especially to induction regulating devices and the like for maintaining substantially constant voltages upon feeder circuits, for example.

In the customarily employed types of motor-driven induction regulators, the contact-making voltmeter, or the equivalent device that is energized in accordance with the electrical condition to be regulated, causes such regulatiton to be carried to the desired point before the energization of the driving motor is cut off. Consequently, the inertia of the various mechanically-connected parts serves to carry the driving motor and the induction regulator beyond the proper degree of compensation, even though some form of braking device is supplied. Under such conditions of over-shooting, the contact-making voltmeter again acts, this time in the opposite direction, to restore normal conditions, but again the necessary regulation is exceeded and thus a substantially continuous "hunting" of the induction regulator is produced, with resultant fluctuation and unsteadiness of the feeder voltage, as well as undue wear and deterioration of various parts of the regulating system.

According to my present invention, I provide various forms of "anti-hunting" means, whereby the above-mentioned braking effect is applied prior to obtaining the desired degree of voltage regulation, and the inertia of the mechanical parts then further carries the regulating action substantially to the desired point. My invention further regulates such anticipatory braking action in accordance with the rate of movement or rotative speed of the induction regulator, and, consequently, the above-mentioned "hunting" or "over-shooting" of the induction regulator is prevented under all operating conditions.

More specifically stated, it is the object of my invention to provide, in connection with a retarding device for the regulator-driving motor, a rheostat which is actuated in accordance with the rate of movement of the retarding device to react upon the contact-making voltmeter supplementary to the ordinary action of the voltage of the circuit to be regulated, whereby the contacts are separated a certain time interval prior to the time when the desired degree of voltage regulation is secured, such interval being directly proportional to the rotative speed of the induction regulator.

For a better understanding of the nature of the present invention, reference may be had to the accompanying drawings, wherein Fig. 1 is a diagrammatic view of a complete regulating system organized in accordance with the invention; Fig. 2, Fig. 3, Fig. 4 and Fig. 6 are diagrammatic representations of modified forms of contact-making voltmeters or control elements that may be substituted for the equivalent apparatus of Fig. 1; Fig. 5 is a diagrammatic plan view of a portion of the mechanism that is shown in Fig. 4; and Fig. 7 is a diagrammatic view of a complete regulating system embodying a modification of the apparatus that is illustrated in Fig. 1.

The form of my invention that is shown in Fig. 1 comprises a feeder or distribution circuit 1 with which is associated, in the usual manner, an induction regulator 2 that is driven by a small motor 3, a retarding device 4 being supplied for rapidly checking the regulator movements after de-energization of the driving motor; and a contact-making voltmeter or control element 5, that is conjointly governed by the voltage of the feeder circuit 1 and in accordance with the rate of rotative speed of the induction regulator, is provided for the anti-hunting purpose already set forth.

The induction regulator 2 may be of any well-known type and comprises a primary stator or voltage winding 10 that is connected across the feeder mains and a secondary rotor or current winding 11 that is connected in series relation with one of the mains. A suitable worm-and-gear transmission mechanism 12 of any well-known type is interposed between the induction regulator 2 and its driving motor 3, which may be of any convenient form, but is here shown as constituting a single-phase motor having an exciting field winding 14, which may be reversed by the operation of the contact-making voltmeter 5, and a rotatable armature 13 which is rigidly mounted upon an operating shaft 15 for the purpose of driving the induction regulator through the transmission mechanism 12 and also for directly actuating a drum or rotatable member 16 that forms a part of the braking or retarding device 4.

The breaking device 4 may be of any approved form for imparting a movement to a secondary member in accordance with the rate of rotation of a primary actuating member and is here shown as comprising, in addition to the drum member 16, the periphery of which is provided with a plurality of radially outwardly extending vanes or plates 17, a secondary or encasing drum or cylinder 18 which is loosely mounted by means of bearings or trunnions 19 upon the shaft 15 of the driving motor 3, the cylinder 18 being provided with a plurality of radially and inwardly extending vanes or ribs 20. A box or tank 21 completely encloses the cylindrical members 16 and 18 and is filled with a suitably viscous fluid 22, such as oil, whereby the movements of the primary drum 16 are imparted to the secondary drum 18 through the agency of the sets of vanes or plates, and a degree of movement of the secondary drum 18, proportional to the rate of rotation of the inner drum 16, thus occurs.

A switch or rheostat arm 23 is insulatedly secured to the outer drum 18 for the purpose of engaging a series of stationary contact members or buttons 24 which are connected to various points of a resistor 25, in accordance with customary practice. The contact buttons 24 are arranged in arcuate relation to permit the desired contact with the rotatable rheostat arm 23, which is biased to a central position, corresponding to the stationary condition of the induction regulator, by means of suitable centering springs 26.

The contact-making voltmeter or control element 5 is shown as comprising a swinging lever 27 which bears upon an intermediately located fulcrum 28, one end of the lever being pivotally secured to a plunger or core 29$^a$ which is upwardly actuated by a main control magnet or coil 29 that is connected across the feeder circuit 1, the lower end of a spring 30 being also secured to that end of the lever 21 to counterbalance the weight of the core member 29$^a$. The other end of the lever 27 is provided with a plurality of independent contact members 31 and 32, and a U-shaped movable contact block or base 33 is suspended from a suitable spring 34 and is provided with a plurality of pairs of independent contact members 35 and 36, and 37 and 38, for respectively engaging the lever contact members 31 and 32 in an upper and in a lower position thereof. The contact block 33 is secured to a dash-pot cylinder 39 which is filled with a suitable liquid, such as oil or distilled water, while the piston member 41 of the dash-pot is rigidly secured to a core member 42, the lower end of which is provided with a small movement-damping dash-pot 43. An upwardly actuating coil 44 (which may be termed the "anti-hunting" coil) for the core member 42 is connected in series relation with a suitable constant source of energy, such as a storage battery 45, and with the active portion of the resistor 25. As previously stated, the movement of the rheostat arm 23 and, therefore, the active amount of the resistor 25 is dependent upon the rate of movement of the regulator and, consequently, an impulse proportional to such rate of movement is imparted to the anti-hunting coil 44, such reaction being transmitted through the dash-pot members 41 and 39 to the movable contact block 33. In this way, the co-operating contact members of the contact block 33 and of the lever 27 are opened or separated a proper time interval in advance of the time that the main control magnet 29 effects a balance of the voltage upon the feeder circuit 1. The above connection between the block 33 and the core member 42 permits only rapid movements of the member 42 to be transmitted to the block 33.

The engagement of the lever contact members 31 and 32 with the upper or with the lower contact members of the block 33 determines the direction of movement of the driving motor 3, and, therefore, of the induction regulator 2 to either raise or lower the feeder-circuit voltage in accordance with the desired condition. Thus, upon an incipient increase of voltage in the feeder circuit 1, the core member 29$^a$ of the main control magnet is upwardly actuated to effect contact between the contact members 31 and 37, and between the members 32 and 38, respectively. Since the lever contact members 31 and 32 are respectively connected to the feeder-circuit mains directly and through the armature 13, and the contact members 37 and 38 are connected to the terminals of the field-magnet winding 14 for the driving motor 3, a certain direction of rotative movement of the driving motor is effected to reduce the feeder-circuit voltage and thus restore normal conditions, the mechanical movement of the secondary drum 18 of the retarding device 4 reacting upon the contact-making volt-meter in such manner as to separate the co-operating contacts thereof an interval of time prior to the establishment of correct voltage conditions upon the feeder circuit 1 that is just sufficient to permit the inertia of the mechanical parts of the regulator 2 and of the driving motor 3 to carry the regulation substantially to the required point and no further, thus effectively preventing any hunting or overshooting. It will be understood that the converse regulating action automatically takes place in the event of an incipient decrease of feeder-circuit voltage.

Figure 2:
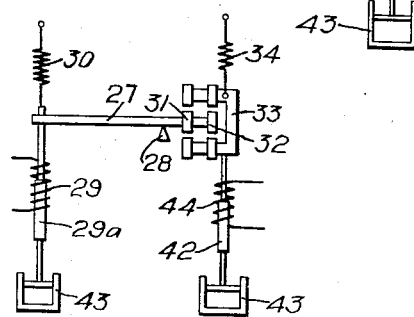

The modified contact-making voltmeter or control element that is shown in Fig. 2 comprises the lever 27, the core member 29ᵃ and its actuating coil 29, and the contact block 33, as illustrated in Fig. 1, but the dash-pot 43 is here associated with the core member 29ᵃ, while a direct mechanical connection between the core member 42 and the contact block 33 is provided. The mode of operation of the illustrated modified control element is very similar to that already set forth, and no further exposition thereof is deemed necessary.

Figure 3:
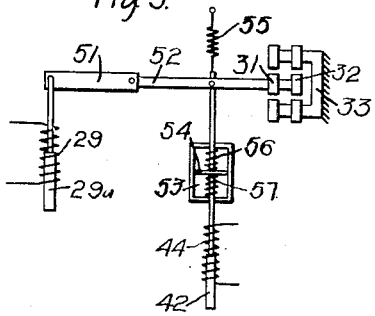
Figure 4:
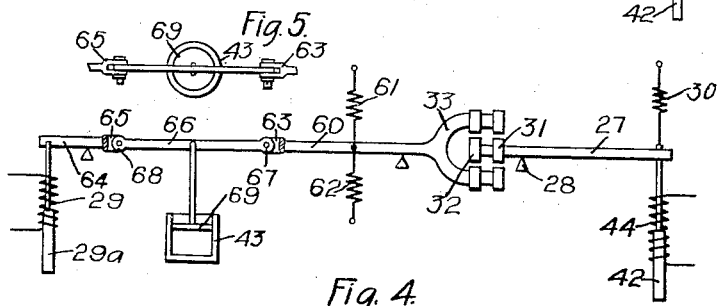

Referring now to Fig. 3, the contact-making voltmeter shown comprises the actuating coil or main control magnet 29, the core member 29ᵃ of which is pivotally secured to one end of a lever or rod 51, a plate spring 52 carrying the contact members 31 and 32 being secured to the other end thereof. In this case, the contact block 33 and its associated contact members are stationary, but a reaction proportional to the rate of movement of the regulator is imparted to the plate spring 52 through the agency of the anti-hunting coil 44 and its core member 42, which is connected to a dash-pot cylinder 53, the co-operating piston 54 which is pivotally secured to an intermediate point of the plate spring 52, which pivotal point is suitably associated with a spring member 55 for resiliently supporting the entire floating mechanism and suitably counterbalancing the weight thereof. To provide a desirable resilient retarding action between the core member 42 and the plate spring 52, a plurality of coil springs 56 and 57 may be provided upon each side of the dash-pot piston 54 in lieu of the body of oil, or the like, that is illustrated in Fig. 1.

The operation of the device illustrated in Fig. 3 may be briefly described as follows. The main control magnet 29 actuates the contact members 31 and 32 in accordance with the voltage of the feeder circuit 1, and, in addition, the above-mentioned reactive impulse, in accordance with the rate of movement of the regulator, is further imparted to the contact members 31 and 32 by means of the anti-hunting coil 44 and the associated mechanism, whereby the co-operating contact members are separated at a predetermined interval of time, dependent upon the rotative speed of the induction regulator, prior to the actual attainment of balanced-voltage conditions in the feeder circuit.

Referring to Figs. 4 and 5, the illustrated contact-making voltmeter comprises the anti-hunting magnet 44 and its movable core member 42, which are associated with the lever 27, the fulcrum 28 and the contact members 31 and 32, as described in connection with the main control magnet 29 of Fig. 1. In the present modification, the contact block 33 is rigidly secured to an arm 60 forming a link of a three-part "broken lever" mechanism, the arm or part 60 being biased to a predetermined position by means of suitable centering springs 61 and 62. The inner end of the arm 60 is formed of substantially U-shape, and a second arm or part 64, to the outer end of which is pivotally attached the core member 29ᵃ of the main control magnet 29, has a similar U-shaped extremity or bifurcation 65 that is located opposite to the U-shaped member 63. An interconnecting lever or rod 66 is pivotally mounted upon pins 67 and 68 that extend through the arms of the U-shaped members 63 and 65, respectively. The piston member 69 of the dash-pot 43 is pivotally associated with an intermediate point of the rod or lever 66.

The illustrated "broken lever" mechanism is governed by the main control magnet 29 in accordance with the variations of feeder circuit voltage, and, upon each impulse that is imparted to the core member 29ᵃ, the lever mechanism, including the contact block 33 will, for an instant, act similarly to a solid rod or lever to effect initial contact with the lever contact members 31 and 32 in the proper manner to produce the desired rotation of the induction-regulator secondary member. Such contact is subsequently controlled conjointly by the anti-hunting magnet 44 in accordance with the rate of movement of the retarding device 4, as previously described, and by the centering springs 61 and 62 which tend to break the "broken lever" mechanism up into its three component parts or elements 60, 66 and 64. The combined arrangement and proportion of parts is such that the properly timed separation of the co-operating contact members is effected to prevent hunting of the induction regulator.

Figure 6:
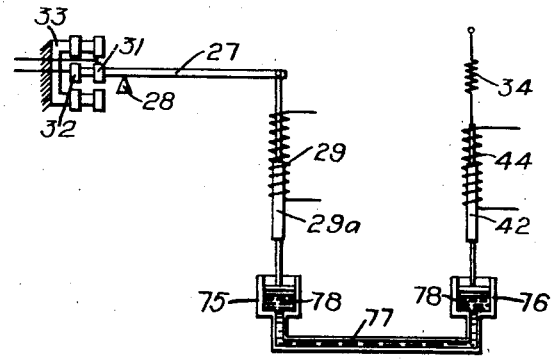
Figure 7:
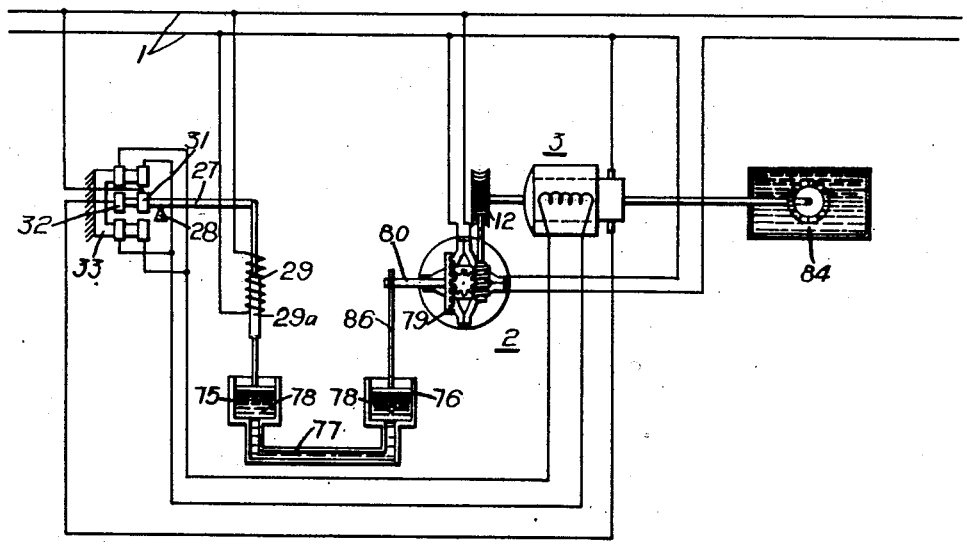

In Fig. 6, the main control magnet 29 and its movable core member 29ᵃ are associated with the right-hand end of the oscillating lever 27 for governing the movement of the contact members 31 and 32 to effect contact with either the upper or the lower set of contact members of the contact block 33 which, in the present modification, is maintained stationary. The core member 29ᵃ for the main control magnet is provided with a dash-pot 75, and the core member 42 for the anti-hunting magnet 44 is suspended from a suitable spring 34 and its lower end is associated with a dash-pot 76. A pipe or passage 77 communicates with the lower ends of both dash-pots 75 and 76, and a suitable fluid medium 78, such as oil or distilled water, is provided for hydraulically imparting an impulse from the one to the other dash-pot piston.

In the present modification, there is no direct mechanical connection between the anti-hunting magnet core 42 and any set of contact members, as illustrated in Fig. 1, but the electrical reaction imparted by the coil 44 to the core member 42 and proportional to the rate of movement of the induction regulator, is transmitted through the illustrated twin dash-pot mechanism to the oscillating lever 27.

In Fig. 7, the induction regulator 2 and the driving motor 3 are associated with the feeder circuit 1, as illustrated in Fig. 1, and a suitable oil-immersed retarding device 84, or the equivalent dynamic brake, for example, is provided in accordance with customary prior practice. The control element or contact-making voltmeter differs from that shown in Fig. 6, only in the substitution of a plain rod member 86 for the core member 42 and its actuating coil 44.

In the present modification, a direct mechanical reaction, in accordance with the rotative speed of the induction regulator 2, is impressed upon the piston of the dash-pot 76, which is rigidly connected to the rod member 86. Such mechanical reaction may be provided, for example, by means of a rack member 79 which is directly engaged by a pinion comprising a portion of the worm-and-gear transmission mechanism 12, the rack member 79 being provided with an arm 80 that is rigidly mounted upon the rod member 86.

Consequently, a double-control reaction is impressed upon the lever contact members 31 and 32, respectively, in accordance with the feeder-circuit voltage as registered by the main control magnet 29, and in accordance with the mechanical movement of the induction regulator 2. The latter reaction is imparted to the contact lever 27 through the agency of the twin dash-pot or hydraulic transmission mechanism comprising the dash-pots 75 and 76 and the interconnecting pipe or passage 77.

It will be understood that the direct mechanical connection between the induction regulator 2 and the anti-hunting rod member 86 may be provided in various ways specifically different from that shown by rendering such mechanical action dependent upon the movement of some other part of the illustrated worm-and-gear mechanism, or upon some equivalent portion of any transmission mechanism different from that illustrated, that may be employed for effecting movement of the regular secondary member from the driving motor 3.

I do not wish to be restricted to the specific circuit connections, structural details or arrangement of parts herein set forth, as various further modifications thereof may be made without departing from the spirit and scope of my invention. I desire, therefore, that only such limitations shall be imposed as are indicated in the appended claims.

I claim as my invention:

1. The combination with a circuit to be regulated, of an automatic regulator therefor, control means therefor energized from said circuit, means dependent upon the rate of movement of said regulator for arresting the circuit regulation substantially at the desired point, and a fluid connection between said means.

2. The combination with a circuit to be regulated, of an induction regulator therefor, control means therefor, means co-operating with said control means and dependent upon the rotative speed of said regulator for preventing over-travelling the necessary degree of regulation, and a fluid connection between said means.

3. The combination with a circuit to be regulated, of an automatic regulator therefor, actuating means for said regulator energized from said circuit, contact means dependent upon the regulated condition of said circuit for operating said actuating means in the one or the other direction, and means dependent upon the rate of movement of said actuating means for reacting upon said contact means.

4. The combination with a circuit to be regulated, of an induction regulator therefor a driving motor for said regulator, a retarding device for said motor, contact means dependent upon the regulated condition of said circuit for actuating said motor in the one or the other direction, and means dependent upon the rate of action of said regulator for reacting upon said contact means.

5. The combination with a circuit to be regulated, of an induction regulator therefor, a driving motor for said regulator, a retarding device for said motor, and a contact-making mechanism having a contact actuated in accordance with the regulated condition of said circuit, said contact being also actuated in accordance with the rate of rotation of said regulator.

6. The combination with a circuit to be regulated, of an induction regulator associated therewith, a driving motor for said regulator, a contact-making mechanism having a contact governed by a coil energized in accordance with the voltage of said circuit, and co-operating reactive means for said contact-making mechanism governed in accordance with the operation of said regulator.

7. A control element comprising a contact lever, an actuating magnet having a core member secured to one end of said lever, a dash-pot co-operating with the free end of said core member, a movable member provided with a second dash-pot hydraulically communicating with the first dash-pot, and means for imparting movement to said movable member.

8. The combination with a circuit to be regulated, of an automatic regulator associated therewith, electrical actuating means for said regulator, a control element comprising a contact lever for governing said actuating means, an actuating coil connected to said circuit and having a co-operating core member secured to one end of the lever, a dash-pot co-operating with the free end of said core member, a movable member provided with a second dash-pot hydraulically communicating with the first dash-pot, and means for imparting to said movable member impulses proportional to the rate of movement of said regulator.

9. The combination with a circuit to be regulated, of an induction regulator associated therewith, a driving motor for said regulator, a retarding device for said motor, a control element comprising a contact lever for governing said motor, an actuating coil connected to said circuit and having a co-operating core member secured to one end of the lever, a dash-pot co-operating with the free end of said core member, a movable member provided with a second dash-pot hydraulically communicating with the first dash-pot, and means for imparting to said movable member impulses proportional to the rotative speed of the induction regulator.

In testimony whereof, I have hereunto subscribed my name this 9th day of Sept., 1918.

CLARENCE A. BODDIE.